United States Patent
Iwasaki et al.

(10) Patent No.: US 9,624,365 B2
(45) Date of Patent: *Apr. 18, 2017

(54) HALOGEN-FREE CROSSLINKABLE RESIN COMPOSITION, CROSS-LINKED INSULATION WIRE AND CABLE

(71) Applicant: Hitachi Metals, Ltd., Tokyo (JP)

(72) Inventors: Makoto Iwasaki, Hitachi (JP); Ryutaro Kikuchi, Mito (JP); Mitsuru Hashimoto, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 14/733,803

(22) Filed: Jun. 8, 2015

(65) Prior Publication Data
US 2016/0002449 A1 Jan. 7, 2016

(30) Foreign Application Priority Data
Jul. 7, 2014 (JP) .................. 2014-139626

(51) Int. Cl.
*H01B 7/00* (2006.01)
*C08L 23/08* (2006.01)
*C08L 23/06* (2006.01)
*H01B 3/44* (2006.01)
*C08L 23/26* (2006.01)

(52) U.S. Cl.
CPC .......... *C08L 23/0869* (2013.01); *C08L 23/06* (2013.01); *C08L 23/26* (2013.01); *H01B 3/441* (2013.01); *H01B 3/447* (2013.01); *H01B 3/448* (2013.01); *C08L 2201/02* (2013.01); *C08L 2203/202* (2013.01); *C08L 2205/035* (2013.01); *C08L 2207/062* (2013.01)

(58) Field of Classification Search
CPC .............................. H01B 7/0208; H01B 7/295
USPC .............................. 174/110 R, 120 R, 121 A
See application file for complete search history.

(56) References Cited

U.S. PATENT DOCUMENTS

| 5,376,739 A * | 12/1994 | Pfleger .................. C08F 210/02 526/329 |
| 6,232,377 B1 * | 5/2001 | Hayashi .................. C08K 3/24 524/100 |

(Continued)

FOREIGN PATENT DOCUMENTS

| JP | 2002-060557 | 2/2002 |
| JP | 2004-156026 | 6/2004 |

OTHER PUBLICATIONS

United States Office Action dated Aug. 19, 2016 in co-pending U.S. Appl. No. 14/931,466.

(Continued)

*Primary Examiner* — Chau N Nguyen
(74) *Attorney, Agent, or Firm* — McGinn IP Law Group, PLLC

(57) ABSTRACT

A halogen-free crosslinkable resin composition includes a base polymer including a high density polyethylene, 30 to 50 parts by mass of an ethylene-acrylic ester-maleic anhydride terpolymer, 5 to 20 parts by mass of an ethylene-α-olefin copolymer modified with maleic anhydride, and 10 to 30 parts by mass of an ethylene-acrylic ester copolymer, and a metal hydroxide of which content is 120 to 200 parts by mass based on 100 parts by mass of the base polymer.

6 Claims, 1 Drawing Sheet

(56) References Cited

U.S. PATENT DOCUMENTS

| | | | | |
|---|---|---|---|---|
| 8,097,809 B2* | 1/2012 | Galletti | ................ | H01B 7/295 |
| | | | | 174/110 R |
| 2007/0149680 A1* | 6/2007 | Kim | ....................... | C08K 3/22 |
| | | | | 524/436 |
| 2007/0187130 A1* | 8/2007 | Park | ....................... | H02G 3/14 |
| | | | | 174/68.1 |
| 2011/0240335 A1* | 10/2011 | Grizante Redondo | . | C08L 23/04 |
| | | | | 174/116 |
| 2013/0149453 A1* | 6/2013 | Romick | .............. | C09D 151/06 |
| | | | | 427/385.5 |

OTHER PUBLICATIONS

United States Office Action dated Aug. 22, 2016 in co-pending U.S. Appl. No. 14/931,456.

\* cited by examiner

HALOGEN-FREE CROSSLINKABLE RESIN COMPOSITION, CROSS-LINKED INSULATION WIRE AND CABLE

The present application is based on Japanese patent application No. 2014-139626 filed on Jul. 7, 2014, the entire contents of which are incorporated herein by reference.

BACKGROUND OF THE INVENTION

1. Field of the Invention

This invention relates to a halogen-free flame retardant crosslinkable resin composition, as well as a cross-linked insulation wire and a cable using the resin composition.

2. Description of the Related Art

An electric wire and a cable applied to a railway vehicle, a motor car, an apparatus and the like are required to have high abrasion resistance, high flame retardancy, excellent low temperature characteristic and the like as needed.

For the purpose of achieving high abrasion resistance, a use of a polymer such as HDPE having high crystallinity as a base polymer constituting an insulating layer is known.

The polymer having high crystallinity, however, has low filler receptivity, thus it is necessary to reduce the additive amount (content) of the filler. Consequently, a halogen based flame retardant or a phosphorus based flame retardant such as red phosphorus that has an effect on flame retardancy by the addition of small amounts is necessarily used.

The halogen based flame retardant, however, generates a halogen gas at the time of combustion, thus the use thereof lacks consideration to the environmental problem to which concern is rising throughout the world. In addition, the phosphorus based flame retardant such as red phosphorus also generates phosgene at the time of combustion and produces phosphoric acid at the time of disposal so as to problematically contaminate underground water vein.

Then, a flame retardant resin composition to which a metal hydroxide that is a halogen-free based flame retardant is added is known (for example, refer to JP-A-2002-60557 and JP-A-2004-156026).

The metal hydroxide does not cause the above-mentioned problem in comparison with the halogen based flame retardant or the phosphorus based flame retardant, but is needed to be filled with high density, thus there is a problem that mechanical characteristic including abrasion resistance and low temperature characteristic are reduced.

SUMMARY OF THE INVENTION

It is an object of the invention to provide a halogen-free crosslinkable resin composition that is capable of maintaining high flame retardancy while having excellent mechanical characteristic and low temperature characteristic, as well as a cross-linked insulation wire and a cable using the resin composition.

(1) According to one embodiment of the invention, a halogen-free crosslinkable resin composition comprises:

a base polymer comprising a high density polyethylene, 30 to 50 parts by mass of an ethylene-acrylic ester-maleic anhydride terpolymer, 5 to 20 parts by mass of an ethylene-α-olefin copolymer modified with maleic anhydride, and 10 to 30 parts by mass of an ethylene-acrylic ester copolymer; and a metal hydroxide of which content is 120 to 200 parts by mass based on 100 parts by mass of the base polymer.

In the above embodiment (1) of the invention, the following modifications and changes can be made.

(i) The ethylene-α-olefin copolymer modified with maleic anhydride has a glass transition point (Tg) of not more than −55 degrees C. by DSC method.

(ii) The ethylene-acrylic ester copolymer has an acrylic ester content of 10 to 30% by mass.

(iii) The metal hydroxide comprises a magnesium hydroxide.

(2) According to another embodiment of the invention, a cross-linked insulation wire comprises:

a conductor; and a first insulating layer covering a periphery of the conductor, wherein the first insulating layer comprises the halogen-free crosslinkable resin composition according to the embodiment (1).

In the above embodiment (2) of the invention, the following modifications and changes can be made.

(iv) The cross-linked insulation wire further comprises a second insulating layer directly covering the conductor, wherein the second insulating layer comprises the halogen-free crosslinkable resin composition comprising the base polymer and the metal hydroxide of which content is not more than 120 parts by mass based on 100 parts by mass of the base polymer.

(v) The metal hydroxide in the halogen-free crosslinkable resin composition constituting the second insulating layer comprises a magnesium hydroxide.

(3) According to another embodiment of the invention, a cable comprises the cross-linked insulation wire according to the embodiment (2).

(4) According to another embodiment of the invention, a cable comprises a sheath comprising the halogen-free crosslinkable resin composition according to the embodiment (1).

Effects of the Invention

According to one embodiment of the invention, a halogen-free crosslinkable resin composition can be provided that is capable of maintaining high flame retardancy while having excellent mechanical characteristic and low temperature characteristic, as well as a cross-linked insulation wire and a cable using the resin composition.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

[Halogen-Free Crosslinkable Resin Composition]

Figure 1:
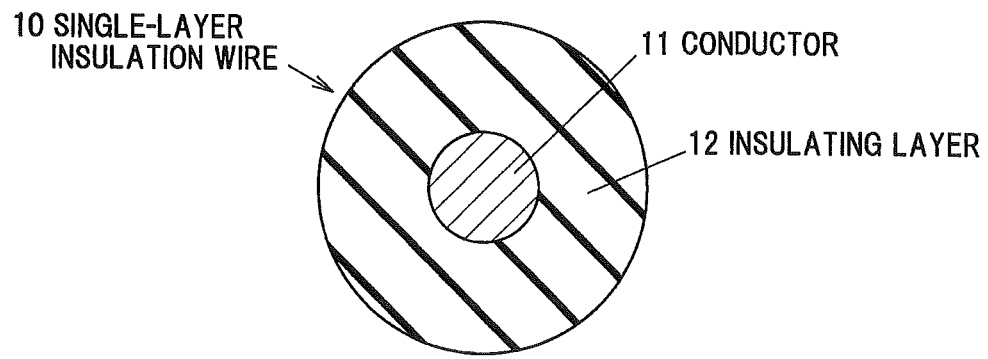
FIG. 1 is a cross-sectional view schematically showing a cross-linked insulation wire according to one embodiment of the invention.

A halogen-free crosslinkable resin composition according to one embodiment of the invention includes a base polymer comprised of a high density polyethylene, 30 to 50 parts by mass of an ethylene-acrylic ester-maleic anhydride terpolymer, 5 to 20 parts by mass of an ethylene-α-olefin copolymer modified with maleic anhydride, and 10 to 30 parts by mass of an ethylene-acrylic ester copolymer, and a metal hydroxide of which content is 120 to 200 parts by mass based on 100 parts by mass of the base polymer.

(High Density Polyethylene)

The base polymer in the halogen-free crosslinkable resin composition includes a high density polyethylene (HDPE). In the embodiment, the base polymer includes HDPE in the range of exemplarily 20 to 55 parts by mass, more exemplarily 25 to 50 parts by mass, and furthermore exemplarily 30 to 45 parts by mass. HDPE used in the invention is not limited in melting point, density and molecular weight thereof. If the additive amount (content) of HDPE is small, abrasion resistance is reduced.

(Ethylene-Acrylic-Ester-Maleic Anhydride Terpolymer)

The base polymer in the halogen-free crosslinkable resin composition includes 30 to 50 parts by mass of an ethylene-acrylic ester-maleic anhydride terpolymer. If the additive amount of the ethylene-acrylic ester-maleic anhydride terpolymer is less than 30 parts by mass, abrasion resistance is reduced, and if more than 50 parts by mass, elongation is reduced.

The ethylene-acrylic ester-maleic anhydride terpolymer has the content of maleic anhydride more than the graft copolymer, thus the terpolymer has strong adhesion to fillers so as to enhance mechanical strength. In particular, it is effective for abrasion resistance.

The ethylene-acrylic ester-maleic anhydride terpolymer includes ethylene-methyl acrylate-maleic anhydride terpolymer, ethylene-ethyl acrylate-maleic anhydride terpolymer, ethylene-butyl acrylate-maleic anhydride terpolymer, and the like. These can be used either singly or as a combination of not less than two.

The content of acrylic ester and the content of maleic anhydride in the ethylene-ethyl acrylate-maleic anhydride terpolymer are not particularly limited, but from the view point of adhesion to fillers, it is exemplary that the content of acrylic ester is 5 to 30% by mass and the content of maleic anhydride is 2.8 to 3.6% by mass. It is more exemplary that the content of acrylic ester is 5 to 20% by mass and the content of maleic anhydride is 2.8 to 3.2% by mass.

(Ethylene-α-Olefin Copolymer Modified with Maleic Anhydride)

The base polymer in the halogen-free crosslinkable resin composition includes 5 to 20 parts by mass of an ethylene-α-olefin copolymer modified with maleic anhydride. If the additive amount of the ethylene-α-olefin copolymer modified with maleic anhydride is less than 5 parts by mass, low temperature characteristic is reduced, and if more than 20 parts by mass, abrasion resistance is reduced.

The ethylene-α-olefin copolymer is excellent in flexibility under a low temperature environment, if modified with maleic anhydride, it can be strengthened in adhesion to fillers such as a metal hydroxide so as to be enhanced in low temperature characteristic.

The ethylene-α-olefin copolymer includes a copolymer of a 3-12C α-olefin and ethylene. The 3-12C α-olefin includes, for example, propylene, 1-butene, 1-pentene, 1-hexene, 4-methyl-pentene, 1-heptene, 1-octene and the like. These can be used either singly or as a combination of not less than two.

The ethylene-α-olefin copolymer modified with maleic anhydride is not particularly limited, but the copolymer has a glass transition point (Tg) of exemplarily not more than −55 degrees C., more exemplarily −65 degrees C. by DSC method.

(Ethylene-Acrylic Ester Copolymer)

The base polymer in the halogen-free crosslinkable resin composition includes 10 to 30 parts by mass of an ethylene-acrylic ester copolymer. If the additive amount of the ethylene-acrylic ester copolymer is less than 10 parts by mass, elongation is reduced, and if more than 30 parts by mass, abrasion resistance is reduced. The ethylene-acrylic ester copolymer is needed for allowing the metal hydroxide to be filled with high density.

The ethylene-acrylic ester copolymer has high filler receptivity, and forms a carbonization layer at the time of combustion so as to enhance flame retardancy. In addition, the copolymer is used for the purpose of enhancing dispersibility of the above-mentioned ethylene-α-olefin copolymer modified with maleic anhydride with the metal hydroxide. It is considered that the fact of the copolymer having an appropriate compatibility with HDPE and the ethylene-α-olefin copolymer modified with maleic anhydride influences on abrasion resistance.

The ethylene-acrylic ester copolymer includes an ethylene-methyl acrylate copolymer, an ethylene-ethyl acrylate copolymer, an ethylene-butyl acrylate copolymer and the like. These can be used either singly or as a combination of not less than two.

It is exemplary that the content of acrylic ester in the ethylene-acrylic ester copolymer is high, and the content is exemplarily 10 to 30% by mass, more exemplarily 10 to 25% by mass.

(Other Polymer Components)

In the base polymer in the embodiment, polymer components other than the above-mentioned polymer components may be included as long as the components provide an effect thereof, but the base polymer includes exemplarily not less than 90%, more exemplarily not less than 95%, and furthermore exemplarily 100% by mass of the above-mentioned polymer components, namely, the high density polyethylene, the ethylene-ethyl acrylate-maleic anhydride terpolymer, the ethylene-α-olefin copolymer modified with maleic anhydride, and the ethylene-acrylic ester copolymer, "100% by mass" meaning that the base polymer is comprised of only the above-mentioned polymer components).

(Metal Hydroxide)

The base polymer in the halogen-free crosslinkable resin composition includes a metal hydroxide of which content is 120 to 200 parts by mass based on 100 parts by mass of the base polymer. If the content of the metal hydroxide is less than 120 parts by mass, sufficient flame retardancy cannot be obtained, and if more than 200 parts by mass, breaking elongation cannot be ensured.

The metal hydroxide includes aluminum hydroxide, magnesium hydroxide, calcium hydroxide and the like. Among these hydroxides, magnesium hydroxide is exemplary because it performs a main dehydration reaction in a high temperature of 350 degrees C. so as to have good flame retardancy. These can be used either singly or as a combination of not less than two.

In consideration with dispersibility, surface treatment may be applied to the metal hydroxide by a silane coupling agent, a titanate based coupling agent, fatty acids such as stearic acid, or the like. If needed to have high heat resistance, it is exemplary that surface treatment by a silane coupling agent is applied thereto. These can be also used either singly or as a combination of not less than two.

(Other Additives)

To the halogen-free crosslinkable resin composition according to the embodiment of the invention, additives may be added as needed, the additives including a cros slinking agent, a crosslinking auxiliary agent, an auxiliary flame retardant, an ultraviolet absorbing agent, a light stabilizer, a softener, a lubricant, a colorant, a reinforcing agent, a surfactant, an inorganic filler, a plasticizer, a metal chelator, a foaming agent, a compatibility accelerator, a processing aid, a stabilizer and the like.

(Crosslinking Method)

A crosslinking method of the halogen-free crosslinkable resin composition according to the embodiment of the invention includes a chemical crosslinking using an organic peroxide, a sulfur compound, a silane compound or the like; a radiation crosslinking by electron beam, radioactive rays or the like; a crosslinking using the other chemical reactions; and the like, but any crosslinking method may be applicable. After the halogen-free crosslinkable resin composition is molded as an insulating layer and a sheath described below, crosslinking treatment is carried out.

[Insulation Wire]

Figure 2:
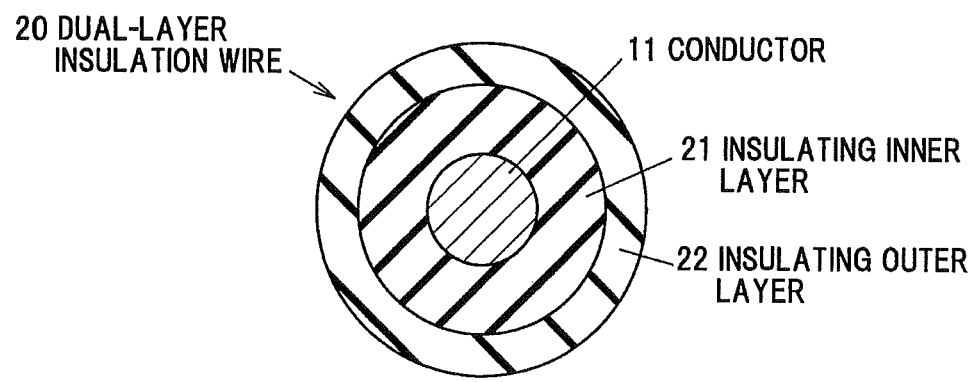
FIG. 2 is a cross-sectional view schematically showing a cross-linked insulation wire according to another embodiment of the invention.

FIGS. 1 and 2 are cross-sectional views schematically showing a cross-linked insulation wire according to one embodiment of the invention respectively.

The single-layer insulation wire 10 includes the conductor 11 comprised of a material for a wide use such as tin-plated copper, and the insulating layer (the first insulating layer) 12 covering a periphery of the conductor 11. The insulating layer 12 can be formed by an extrusion molding.

The insulating layer 12 is comprised of the above-mentioned halogen-free crosslinkable resin composition according to the embodiment of the invention, and is formed by being cross-linked after the molding.

In the embodiment, the insulating layer 12 may be constituted of a single layer as shown in FIG. 2 or also a multiple layer (a dual layer in FIG. 2).

The dual-layer insulation wire 20 according to the embodiment shown in FIG. 2 includes the conductor 11, the insulating inner layer 21 (the second insulating layer) directly covering the conductor 11, and the insulating outer layer 22 (the first insulating layer) covering a periphery of the insulating inner layer 21. The insulating inner layer 21 and the insulating outer layer 22 can be formed by a dual-layer co-extrusion molding.

The insulating outer layer 22 is comprised of the above-mentioned halogen-free crosslinkable resin composition according to the embodiment of the invention similarly to the insulating layer 12, and it is exemplary to be formed by being cross-linked after the molding.

In case that greater emphasis is placed on electrical characteristic, it is exemplary that the insulating inner layer 21 is comprised of the halogen-free crosslinkable resin composition including the metal hydroxide of which content is not more than 120 parts by mass based on 100 parts by mass of the base polymer. The content of the metal hydroxide is more exemplarily not more than 110 parts by mass, furthermore exemplarily not more than 100 parts by mass, and the most exemplarily not more than 50 parts by mass. The lower limit of the metal hydroxide content is exemplarily not less than 0 parts by mass, and more exemplarily not less than 30 parts by mass. The base polymer is not particularly limited, but includes, for example, a polyolefin such as a high density polyethylene, a medium density polyethylene, a low density polyethylene, a very low density polyethylene, an ethylene-acrylic ester copolymer. These can be used either singly or as a blend of not less than two. Particularly, when mechanical characteristics are required, it is exemplary to apply the base polymer used in the above-mentioned halogen-free crosslinkable resin composition according to the embodiment of the invention. In addition, as the metal hydroxide, the above-mentioned hydroxides can be used, but magnesium hydroxide is exemplary.

The single-layer insulation wire 10 and the dual-layer insulation wire 20 may include a braided wire and the like as needed.

[Cable]

The cable according to the embodiment of the invention includes the above-mentioned cross-linked insulation wire according to the embodiment of the invention. For example, the cable according to the embodiment includes a double-core twisted wire obtained by that two single-layer insulation wires 10 according to the embodiment are twisted together and a sheath formed on an outer periphery of the double-core twisted wire. The insulation wire may be a single-core wire or a multiple-core twisted wire other than double-core twisted wire. In addition, a braided wire and the like may be included as needed.

The sheath is comprised of the above-mentioned halogen-free crosslinkable resin composition according to the embodiment of the invention, and it is exemplary that the sheath t is constituted of a cross-linked molding obtained by being cross-linked after the molding. In this case, as the internal insulation wire, not only the cross-linked insulation wire according to the embodiment, but also an insulation wire using a material for a wide use can be used.

[Advantageous Effect of the Embodiment of the Invention]

According to the embodiment of the invention, a halogen-free crosslinkable resin composition, a cross-linked insulation wire and a cable that are capable of maintaining high flame retardancy while having excellent mechanical characteristic and low temperature characteristic can be provided. In addition, according to the more exemplary embodiment of the invention, in addition to the above-mentioned advantageous effect, a cross-linked insulation wire and a cable that have excellent electrical characteristics.

Hereinafter, the invention will be explained more specifically by Examples. It is to be noted that the invention is not limited by the following Examples at all.

[Examples 1 to 14 and Comparative Examples 1 to 9]

The insulation wires shown in FIGS. 1 and 2 were manufactured as follows.

(1) As the conductor 11, a tin-plated conductor having a configuration of 37 numbers/0.18 mm was used.
(2) Various components shown in Table 1 and Table 2 were formulated and kneaded by a 14-inch open roll, followed by pelletizing the resultant resin composition by a granulator, so as to obtain materials for an outer layer and materials for an inner layer.
(3) In the manufacture of the single-layer insulation wire 10 shown in FIG. 1, by using the resultant materials for an outer layer, the conductor 11 was covered with the insulating layer 12 by a 40-mm extruder so as to have an insulation thickness of 0.26 mm
(4) In the manufacture of the dual-layer insulation wire 20 shown in FIG. 2, by using the resultant materials for an outer layer and materials for an inner layer, the conductor 11 was covered with the insulating inner layer 21 and the insulating outer layer 22 by carrying out a dual-layer co-extrusion by a 40-mm extruder so as to have an inner layer thickness of 0.1 mm and an outer layer thickness of 0.16 mm
(5) The resultant insulation wires were irradiated with electron beam (radiation value: 15 Mrad) so as to be cross-linked The resultant cross-linked insulation wires were evaluated by various evaluation tests shown below. The evaluation results are shown in Tables 1 to 2.

(1) Tensile Test

Tensile test was carried out at a tension rate of 200 mm/min to the insulating layers as a residue after the conductors 11 was pulled out from the insulation wire. The insulation wires of the insulating layers having breaking elongation of not less than 50% were determined as a non-defective one (○) and the insulation wires of the insulating layers having breaking elongation of less than 50% were determined as a defective one (X).

(2) Low Temperature Test

The insulation wires were left in a low temperature tank of −40 degrees C. for not less than 4 hours, and were wound by six turns around mandrels having a diameter of 1.75 mm and 7.0 mm. The insulation wires of which the insulating layers were not broken by the winding around the mandrels having a diameter of 1.75 mm and 7.0 mm were determined as an excellent one (⊚), the insulation wires of which the insulating layers were broken by the winding around the mandrel having a diameter of 1.75 mm and not broken by the winding around the mandrel having 7.0 mm were determined as a non-defective one (○) and the insulation wires of which the insulating layers were both broken by the winding around the mandrels having a diameter of 1.75 mm and 7.0 mm were determined as a defective one (X).

(3) Flame Retardancy Test

The insulation wires having a length of 600 mm were vertically held and flames were applied thereto for 60 seconds. The insulation wires that were extinguished within 60 seconds after the removal of the flames were determined as a non-defective one (○) and the insulation wires that were not extinguished within 60 seconds after the removal of the flames were determined as a defective one (X).

(4) Abrasion Test

The insulation wires were evaluated in accordance with EN50305.5.2. The insulation wires in which the number of abrasion cycles was not less than 150 cycles were determined as a non-defective one (○) and the insulation wires in which the number of abrasion cycles was less than 150 cycles were determined as a defective one (X).

(5) Electrical Characteristics Test

A 300V DC stability test was carried out to the insulation wires in accordance with EN50305.6.7. The insulation wires in which a short circuit did not occur for 240 hours were determined as an excellent one (⊚), the insulation wires in which a short circuit occurred in a period of not less than 100 hours and less than 240 hours were determined as a non-defective one (○) and the insulation wires in which a short circuit occurred in a period of less than 100 hours were determined as a somewhat defective one (Δ).

(6) Comprehensive Evaluation

As a comprehensive evaluation, the insulation wires in which all evaluations of the above-mentioned tests were an excellent one (⊚) or a non-defective one (○) were determined as an excellent one (⊚), the insulation wires in which a somewhat defective one (Δ) is included as the evaluation were determined as a non-defective one (○) and the insulation wires in which a defective one (X) is included as the evaluation were determined as a defective one (X).

TABLE 1

Examples (Unit of formulation: parts by mass)

| | Items | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Materials for outer layer | High density polyethylene[1] | 30 | 35 | 30 | 30 | 30 | 30 | 45 | 30 | 30 | 30 | 30 | 30 | 30 | 30 |
| | Ethylene-ethyl acrylate-maleic anhydride terpolymer[2] | 35 | 30 | 50 | 40 | 40 | 35 | 35 | 30 | 30 | 30 | 30 | 30 | 30 | 30 |
| | Ethylene-α-olefin copolymer modified with maleic anhydride[3] | 10 | 10 | 10 | 5 | — | 20 | 10 | 10 | 10 | 10 | 10 | 10 | 10 | 10 |
| | Ethylene-α-olefin copolymer modified with maleic anhydride[4] | — | — | — | — | 5 | — | — | — | — | — | — | — | — | — |
| | Ethylene-ethyl acrylate copolymer[5] | 25 | 25 | 10 | 25 | 25 | 15 | 10 | 30 | 30 | 30 | 30 | 30 | 30 | 30 |
| | Magnesium hydroxide[6] | 170 | 170 | 170 | 170 | 170 | 170 | 170 | 170 | 200 | 120 | 200 | 200 | 120 | 120 |
| Materials for inner layer | High density polyethylene[1] | 30 | 30 | 30 | 30 | 30 | 30 | 30 | 30 | 30 | 30 | 30 | 30 | — | — |
| | Ethylene-ethyl acrylate-maleic anhydride terpolymer[2] | 30 | 30 | 30 | 30 | 30 | 30 | 30 | 30 | 30 | 30 | 30 | 30 | — | — |
| | Ethylene-α-olefin copolymer modified with maleic anhydride[3] | 20 | 20 | 20 | 20 | 20 | 20 | 20 | 20 | 20 | 20 | 20 | 20 | — | — |
| | Ethylene-ethyl acrylate copolymer[5] | 30 | 30 | 30 | 30 | 30 | 30 | 30 | 30 | 30 | 30 | 30 | 30 | — | — |
| | Magnesium hydroxide[6] | 30 | 30 | 30 | 30 | 30 | 30 | 30 | 30 | 30 | 30 | 100 | 150 | — | — |
| Evaluation | Tensile test (Breaking elongation (%))/Determination | 75 ○ | 70 ○ | 50 ○ | 70 ○ | 70 ○ | 65 ○ | 50 ○ | 85 ○ | 50 ○ | 110 ○ | 50 ○ | 50 ○ | 110 ○ | 90 ○ |
| | Low temperature test | ⊚ | ⊚ | ○ | ○ | ⊚ | ⊚ | ○ | ⊚ | ○ | ⊚ | ○ | ○ | ⊚ | ⊚ |
| | Flame retardancy test | ○ | ○ | ○ | ○ | ○ | ○ | ○ | ○ | ○ | ○ | ○ | ○ | ○ | ○ |
| | Abrasion test (Number of abrasion cycles)/Determination | 200 ○ | 252 ○ | 303 ○ | 282 ○ | 282 ○ | 162 ○ | 493 ○ | 175 ○ | 169 ○ | 170 ○ | 168 ○ | 165 ○ | 165 ○ | 170 ○ |
| | Electrical characteristics test (Short-circuit time (h))/Determination | 240 ⊚ | 240 ⊚ | 240 ⊚ | 240 ⊚ | 240 ⊚ | 240 ⊚ | 240 ⊚ | 240 ⊚ | 240 ⊚ | 240 ⊚ | 120 ○ | 50 Δ | 110 ○ | 110 ○ |
| | Comprehensive evaluation | ⊚ | ⊚ | ⊚ | ⊚ | ⊚ | ⊚ | ⊚ | ⊚ | ⊚ | ⊚ | ○ | ○ | ⊚ | ⊚ |

[1] From Prime Polymer, HI-ZEX 5305E
[2] From Arkema, BONDINE LX4110 (Maleic anhydride content 3 wt %, Acrylic ester content 5 wt %)
[3] From Mitsui Chemicals, TAFMER MA8510 (Glass transition point: −55° C.)
[4] From Mitsui Chemicals, TAFMER MH7020 (Glass transition point: −65° C.)
[5] Examples 1 to 13 from Japan Polyethylene Corporation REXPERLA1150 (Acrylic ester content 15 wt %); Example 14 from Du Pont-Mitsui Fluorochemicals, Elvaloy 1209AC (Acrylic ester content 9 wt %)
[6] From Kyowa Chemical, KISMA 5L

TABLE 2

Comparative Examples (Unit of formulation: parts by mass)

| | | Examples Comparative Examples | | | | | | | | |
|---|---|---|---|---|---|---|---|---|---|---|
| | Items | 1 | 2 | 3 | 4 | 5 | 6 | 7 | 8 | 9 |
| Materials for outer layer | High density polyethylene[1] | — | 30 | 30 | 30 | 30 | 50 | 30 | 30 | 30 |
| | Low density polyethylene[2] | 25 | — | — | — | — | — | — | — | — |
| | Ethylene-ethyl acrylate-maleic anhydride terpolymer[3] | 40 | 25 | 55 | 45 | 35 | 35 | 30 | 30 | 30 |
| | Ethylene-α-olefin copolymer modified with maleic anhydride[4] | 10 | 20 | 5 | 0 | 25 | 10 | 5 | 10 | 10 |
| | Ethylene-ethyl acrylate copolymer[5] | 25 | 25 | 10 | 25 | 10 | 5 | 35 | 30 | 30 |
| | Magnesium hydroxide[6] | 170 | 170 | 170 | 170 | 170 | 170 | 170 | 210 | 110 |
| Materials for inner layer | High density polyethylene[1] | 30 | 30 | 30 | 30 | 30 | 30 | 30 | — | — |
| | Ethylene-ethyl acrylate-maleic anhydride terpolymer[3] | 30 | 30 | 30 | 30 | 30 | 30 | 30 | — | — |
| | Ethylene-α-olefin copolymer modified with maleic anhydride[4] | 20 | 20 | 20 | 20 | 20 | 20 | 20 | — | — |
| | Ethylene-ethyl acrylate copolymer[5] | 30 | 30 | 30 | 30 | 30 | 30 | 30 | — | — |
| | Magnesium hydroxide[6] | 30 | 30 | 30 | 30 | 30 | 30 | 30 | — | — |
| Evaluation | Tensile test (Breaking elongation (%))/ Determination | 75 ○ | 95 ○ | 45 X | 70 ○ | 65 ○ | 25 X | 95 ○ | 45 X | 125 ○ |
| | Low temperature test | ◎ | ◎ | ◎ | X | ◎ | X | ◎ | ◎ | ◎ |
| | Flame retardancy test | ○ | ○ | ○ | ○ | ○ | ○ | ○ | ○ | X |
| | Abrasion test (Number of abrasion cycles)/ Determination | 143 X | 145 X | 255 ○ | 300 ○ | 122 X | 520 ○ | 133 X | 160 ○ | 163 ○ |
| | Electrical characteristics test (Short-circuit time (h))/Determination | 240 ◎ | 240 ◎ | 240 ◎ | 240 ◎ | 240 ◎ | 240 ◎ | 240 ◎ | 5 Δ | 90 Δ |
| | Comprehensive evaluation | X | X | X | X | X | X | X | X | X |

[1]From Prime Polymer, HI-ZEX 5305E
[2]From Prime Polymer, MIRASON 3530
[3]From Arkema, BONDINE LX4110 (Maleic anhydride content 3 wt %, Acrylic ester content 5 wt %)
[4]From Mitsui Chemicals, TAFMER MA8510 (Glass transition point: −55° C.)
[5]From Japan Polyethylene Corporation REXPERL A1150 (Acrylic ester content 15 wt %)
[6]From Kyowa Chemical, KISMA 5L As shown in FIG. 1, in case of Examples 1 to 11, 13 and 14, all the evaluations thereof were an excellent one (◎) or a non-defective one (○), thus the comprehensive evaluation thereof was determined as an excellent one (◎). In case of Example 12, a short circuit occurred in 50 hours in an electrical characteristics test (a DC stability test), thus an evaluation of a somewhat defective one (Δ) was determined, but the other evaluations were determined as a non-defective one (○), thus the comprehensive evaluation thereof was determined as a non-defective one (○).

As shown in FIG. 2, Comparative Examples 1 to 9 were evaluated as follows.

In case of Comparative Example 1, LDPE was used as the material for an outer layer instead of HDPE, thus the number of abrasion cycles thereof was 143 cycles so as to be determined as a defective one (X). Consequently, the comprehensive evaluation thereof was determined as a defective one (X).

In case of Comparative Example 2, in the material for an outer layer, the additive amount of ethylene-ethyl acrylate-maleic anhydride terpolymer was small, thus the number of abrasion cycles thereof was 145 cycles so as to be determined as a defective one (X). Consequently, the comprehensive evaluation thereof was determined as a defective one (X).

In case of Comparative Example 3, in the material for an outer layer, the additive amount of ethylene-ethyl acrylate-maleic anhydride terpolymer was large, thus the breaking elongation thereof was low as 40% so as to be determined as a defective one (X). Consequently, the comprehensive evaluation thereof was determined as a defective one (X).

In case of Comparative Example 4, in the material for an outer layer, the ethylene-α-olefin copolymer modified with maleic anhydride was not added thereto, thus in the low temperature test, at the time of the winding around the mandrels having a diameter of 1.75 mm and 7.0 mm, breaking both occurred so as to be determined as a defective one (X). Consequently, the comprehensive evaluation thereof was determined as a defective one (X).

In case of Comparative Example 5, in the material for an outer layer, the additive amount of ethylene-α-olefin copolymer modified with maleic anhydride was large, thus the number of abrasion cycles thereof was 122 cycles so as to be determined as a defective one (X). Consequently, the comprehensive evaluation thereof was determined as a defective one (X).

In case of Comparative Example 6, in the material for an outer layer, the additive amount of ethylene-acrylic ester copolymer was small, thus the breaking elongation thereof was very low as 20% so as to be determined as a defective one (X), and in the low temperature test, at the time of the winding around the mandrels having a diameter of 1.75 mm and 7.0 mm, breaking both occurred so as to be determined as a defective one (X). Consequently, the comprehensive evaluation thereof was determined as a defective one (X).

In case of Comparative Example 7, in the material for an outer layer, the additive amount of ethylene-acrylic ester copolymer was large, thus the number of abrasion cycles thereof was 133 cycles so as to be determined as a defective one (X). Consequently, the comprehensive evaluation thereof was determined as a defective one (X).

In case of Comparative Example 8, in the material for an outer layer, the additive amount of metal hydroxide was large, thus the breaking elongation thereof was low as 40% so as to be determined as a defective one (X). In addition, in an electrical characteristics test (a DC stability test), a short circuit occurred in 5 hours so as to be determined as a somewhat defective one (Δ). Consequently, the comprehensive evaluation thereof was determined as a defective one (X).

In case of Comparative Example 9, in the material for an outer layer, the additive amount of metal hydroxide was small, thus in the flame retardancy test, it was burnt down so as to be determined as a defective one (X). In addition, in an electrical characteristics test (a DC stability test), a short circuit occurred in 90 hours so as to be determined as a somewhat defective one (Δ). Consequently, the comprehensive evaluation thereof was determined as a defective one (X).

From the above results, it can be seen that it is needed to include a base polymer configured such that HDPE, 30 to 50 parts by mass of an ethylene-ethyl acrylate-maleic anhydride terpolymer, 5 to 20 parts by mass of an ethylene-α-olefin copolymer modified with maleic anhydride, and 10 to 30 parts by mass of an ethylene-acrylic ester copolymer are mixed with each other, and needed to include a metal hydroxide of which content is 120 to 200 parts by mass based on 100 parts by mass of the base polymer.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A cross-linked insulation wire, comprising:
   a conductor; and
   a first insulating layer covering a periphery of the conductor,
   wherein the first insulating layer comprises a halogen-free crosslinkable resin composition, the halogen-free crosslinkable resin composition comprising:
   a base polymer comprising a high density polyethylene, 30 to 50 parts by mass of an ethylene-acrylic ester-maleic anhydride terpolymer, 5 to 20 parts by mass of an ethylene-α-olefin copolymer modified with maleic anhydride, and 10 to 30 parts by mass of an ethylene-acrylic ester copolymer; and
   a metal hydroxide of which content is 120 to 200 parts by mass based on 100 parts by mass of the base polymer;
   the cross-linked insulation wire further comprising a second insulating layer directly covering the conductor, wherein the second insulating layer comprises the halogen-free crosslinkable resin composition comprising the base polymer and the metal hydroxide of which content is not more than 120 parts by mass based on 100 parts by mass of the base polymer.

2. The cross-linked insulation wire according to claim 1, wherein the ethylene-a-olefin copolymer modified with maleic anhydride has a glass transition point (Tg) of not more than -55 degrees C. by a Differential Scanning calorimetry (DSC) method.

3. The cross-linked insulation wire according to claim 1, wherein the ethylene-acrylic ester copolymer has an acrylic ester content of 10 to 30% by mass.

4. The cross-linked insulation wire according to claim 1, wherein the metal hydroxide of the first insulating layer comprises a magnesium hydroxide.

5. The cross-linked insulation wire according to claim 1, wherein the metal hydroxide in the halogen-free crosslinkable resin composition constituting the second insulating layer comprises a magnesium hydroxide.

6. A cable, comprising the cross-linked insulation wire according to claim 1.

* * * * *